United States Patent
Sobel et al.

(10) Patent No.: US 9,183,377 B1
(45) Date of Patent: Nov. 10, 2015

(54) UNAUTHORIZED ACCOUNT MONITORING SYSTEM AND METHOD

(75) Inventors: William E. Sobel, Jamul, CA (US);
Brian Hernacki, San Carlos, CA (US);
Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1698 days.

(21) Appl. No.: 12/141,736

(22) Filed: Jun. 18, 2008

(51) Int. Cl.
*G06F 11/00* (2006.01)
*G06F 21/50* (2013.01)
*G06F 21/55* (2013.01)

(52) U.S. Cl.
CPC ............... *G06F 21/50* (2013.01); *G06F 21/55* (2013.01)

(58) Field of Classification Search
CPC ........... H04L 63/1441; H04L 63/1408; H04L 63/1433; H04L 63/1416; H04L 63/1458; H04L 2463/102; H04L 63/10; G06F 21/554; G06F 21/55; G06F 21/56; G06F 21/577; G06F 21/566; G06F 11/3051; G06F 21/50; G06F 21/552; G06F 21/44; G06Q 20/4016; Y10S 707/99945; Y10S 707/99948
USPC ............. 726/22–25, 26–30, 31–34, 1, 4, 6, 7, 726/16–19, 21; 713/188, 189
See application file for complete search history.

(56) References Cited

U.S. PATENT DOCUMENTS

| | | | | |
|---|---|---|---|---|
| 2002/0099944 A1* | 7/2002 | Bowlin | ......................... | 713/185 |
| 2003/0144952 A1* | 7/2003 | Brown et al. | .................. | 705/40 |
| 2003/0151623 A1* | 8/2003 | Shimada et al. | .............. | 345/752 |
| 2004/0024864 A1* | 2/2004 | Porras et al. | .................. | 709/224 |
| 2004/0054674 A1* | 3/2004 | Carpenter et al. | ................ | 707/9 |
| 2004/0260565 A1* | 12/2004 | Zimniewicz et al. | ............. | 705/1 |
| 2005/0086538 A1* | 4/2005 | Kubota | ......................... | 713/201 |
| 2005/0091182 A1* | 4/2005 | Chen et al. | ........................ | 707/1 |
| 2005/0144060 A1* | 6/2005 | Chen et al. | ........................ | 705/9 |
| 2005/0289348 A1* | 12/2005 | Joy et al. | ........................ | 713/172 |
| 2008/0066179 A1* | 3/2008 | Liu | ................................. | 726/24 |
| 2009/0083731 A1* | 3/2009 | Sobel | ............................ | 717/177 |
| 2009/0281816 A1* | 11/2009 | Houga et al. | ...................... | 705/1 |

OTHER PUBLICATIONS

"About Service Logon Accounts", pp. 1-2 [online]. Retrieved on May 2, 2008 from the Internet: <URL:http://msdn.microsoft.com/en-us/library/ms674946(VS.85,printer).aspx>. No author provided.
"How to Launching OLE Servers from ISAPI Extensions", pp. 1-2 [online]. Retrieved on May 2, 2008 from the Internet: <URL:http://support.microsoft.com/kb/156223/en-us>. No author provided.
"IWAM_computername Account Remains Part of MTS Trusted Impersonators Group After Upgrade", p. 1 [online]. Retrieved on May 2, 2008 from the Internet: <URL:http://support.microsoft.com/kb/214782/en-us>. No author provided.

(Continued)

*Primary Examiner* — Nirav B Patel

(74) *Attorney, Agent, or Firm* — Wilmer Cutler Pickering Hale and Dorr LLP

(57) ABSTRACT

A possibly pre-infected system is inspected for the existence of tracked application-specific accounts. In a tracked application-specific account is found, the system is further audited to verify that only authorized processes are using the account and that the authorized account creation application is installed on the host computer system.

15 Claims, 5 Drawing Sheets

(56) References Cited

OTHER PUBLICATIONS

Meier et al., "How to: Create a Service Account for an ASP.NET 2.0 Application" pp. 1-8 [online]. Retrieved on May 19, 2008 from the Internet: <URL:http://msdn.microsoft.com/en-us/library/ms998297(printer).aspx>.

"Selecting an Account for the SQL Server Agent Service", pp. 1-3 [online]. Retrieved on May 2, 2008 from the Internet: <URL:http://msdn.microsoft.com/en-us/library/ms191543(printer).aspx>. No author provided.

"Services and Service Accounts Security Planning Guide: Chapter 1—Introduction", pp. 1-3 [online]. Retrieved on May 2, 2008 from the Internet: <URL:http://www.microsoft.com/technet/security/guidance/serversecurity/serviceaccount/sspgch01.mspx?pf=true>. No author provided.

"Services and Service Accounts Security Planning Guide: Chapter 2—The Approach to Running Services More Securely", pp. 1-8 [online]. Retrieved on May 2, 2008 from the Internet: <URL:http://www.microsoft.com/technet/security/guidance/serversecurity/serviceaccount/sspgch02.mspx?pf=true>. No author provided.

"Windows Service", pp. 1-2 [online]. Retrieved on May 19, 2008 from the Internet: <URL:http://en.wikipedia.org/wiki/Windows_service>. No author provided.

* cited by examiner

| Allowed accounts database 140 | | |
|---|---|---|
| Account 304A | Application 306A | Process 308A |
| Account 304B | Application 306B | Process 308B |
| ⋮ | ⋮ | ⋮ |
| Account 304n | Application 306n | Process 308n |

FIG. 3

UNAUTHORIZED ACCOUNT MONITORING SYSTEM AND METHOD

BACKGROUND

1. Field of the Invention

The present invention relates to computer system security. More particularly, the present invention relates to a system and method of detecting malicious code on a computer system.

2. Description of the Related Art

Services are executable programs that run in sessions outside of the currently logged-on user's session. Typically, services run in the background and may not show any user interface. Services can start automatically when the computer system starts, can be paused and restarted. Accordingly, services are prime vulnerability points for attackers to compromise a computer system.

A service must run under the context of an account. An account establishes the privileges of a service running within the context of the account.

The principle of least privileges states that you give a service the least amount of access it requires to serve its function and nothing more. Thus, to protect against a service that may be malicious, the service is run under the context of an account that provides the service the necessary privileges required to serve its function and nothing more. However, additional protection against malicious services is still needed.

SUMMARY OF THE INVENTION

A possibly pre-infected system is inspected for the existence of tracked application-specific accounts. If a tracked application-specific account is found, the system is further audited to verify that only authorized processes are using the account and that the authorized account creation application is installed on the system. For example, on a Microsoft® Windows® type operating system, the list of active services, i.e., processes, are checked to determine that no unauthorized (unexpected) services are running in one of the tracked application-specific accounts.

In accordance with another embodiment, real time requests to create tracked application-specific accounts are intercepted. If the account creation application that is creating the account is authorized to do so, the account is allowed to be created. Conversely, if the account creation application that is creating the account is not authorized to do so, the account creation is prevented or other protective action taken. This real time monitoring effectively closes off the creation of malicious accounts disguised as commonly used accounts, i.e., as tracked application-specific accounts.

In accordance with another embodiment, real time requests to create processes within tracked application-specific accounts are intercepted. If the process being created is authorized to use the account, the process is allowed to be created. Conversely, if the process being created is not authorized to use the account, the process creation is prevented or other protective action taken. This real time monitoring effectively closes off the creation of malicious processes within commonly used accounts.

Embodiments are best understood by reference to the following detailed description when read in conjunction with the accompanying drawings.

BRIEF DESCRIPTION OF THE DRAWINGS

FIG. 3 is a block diagram of an allowed accounts database in accordance with one embodiment;

Common reference numerals are used throughout the drawings and detailed description to indicate like elements.

DETAILED DESCRIPTION

Figure 1:
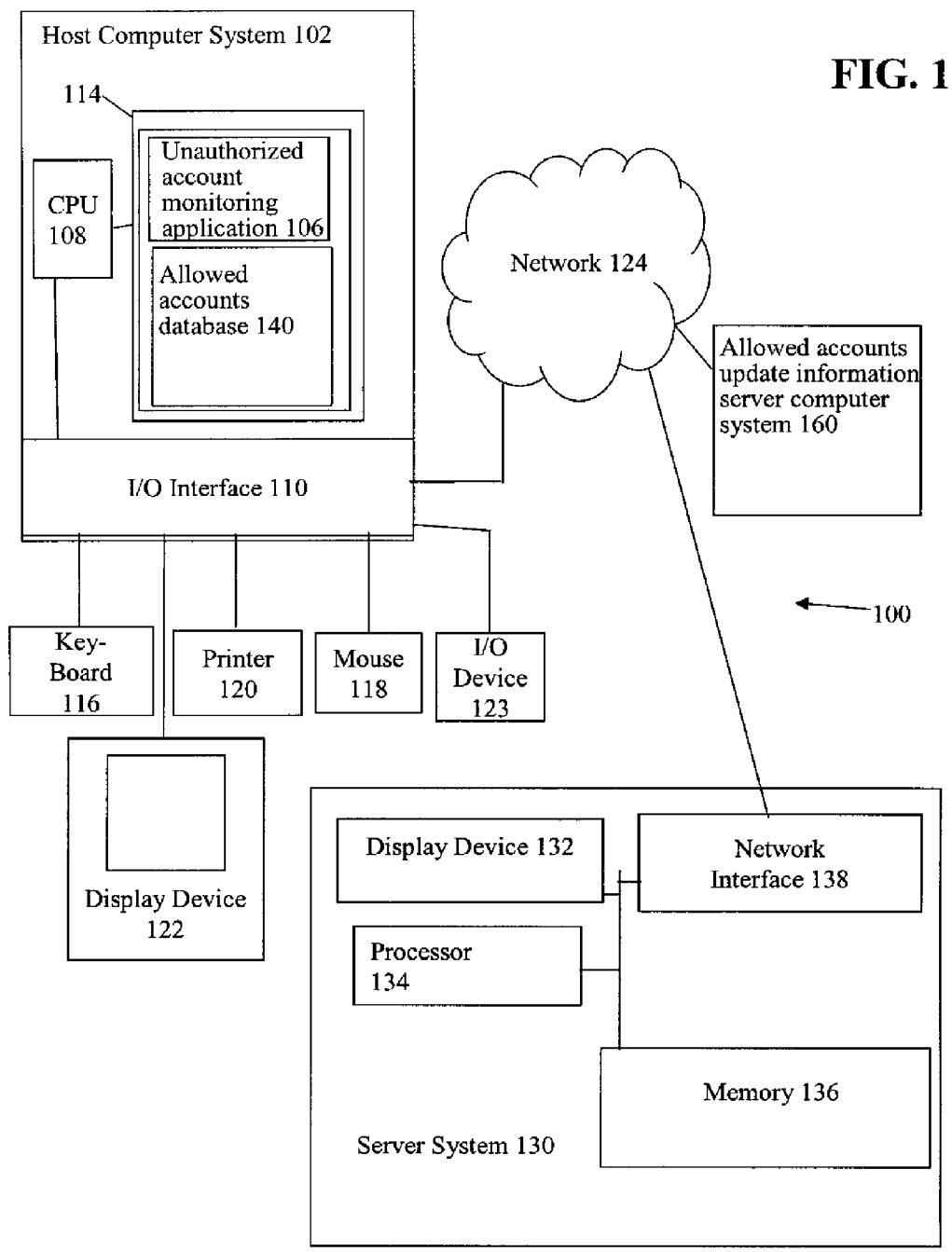
FIG. 1 is a diagram of a client-server system that includes an unauthorized account monitoring application executing on a host computer system in accordance with one embodiment.
Figure 2:
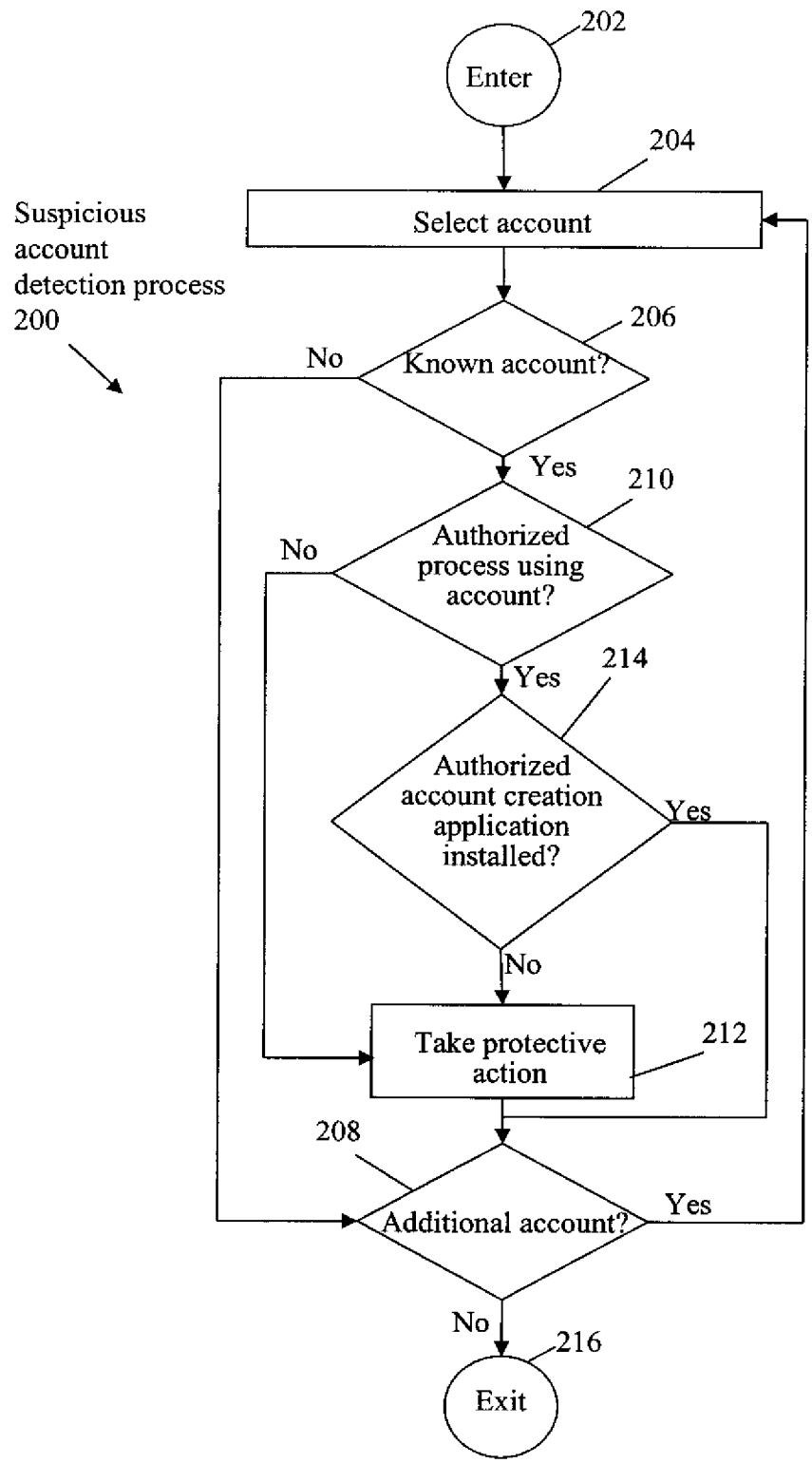
FIG. 2 is a flow diagram of a suspicious account detection process in accordance with one embodiment.

In accordance with one embodiment, referring to FIGS. 1 and 2 together, a possibly pre-infected system, e.g., host computer system 102, is inspected for the existence of tracked application-specific accounts. If a tracked application-specific account is found, the host computer system 102 is further audited to verify that only authorized processes are using the account in an AUTHORIZED PROCESS USING ACCOUNT CHECK OPERATION 210. Host computer system 102 is further audited to verify that the authorized account creation application authorized to create the account is installed on host computer system 102 in an AUTHORIZED ACCOUNT CREATION APPLICATION INSTALLED CHECK OPERATION 214. For example, on a Microsoft® Windows® type operating system, the list of active services, i.e., processes, are checked to determine that no unauthorized, e.g., malicious, services are running in one of the tracked application-specific accounts. If an unauthorized process is detected or the authorized account creation application is not installed, protective action is taken in a TAKE PROTECTIVE ACTION OPERATION 212, e.g., the unauthorized process and/or account is terminated.

Figure 4:
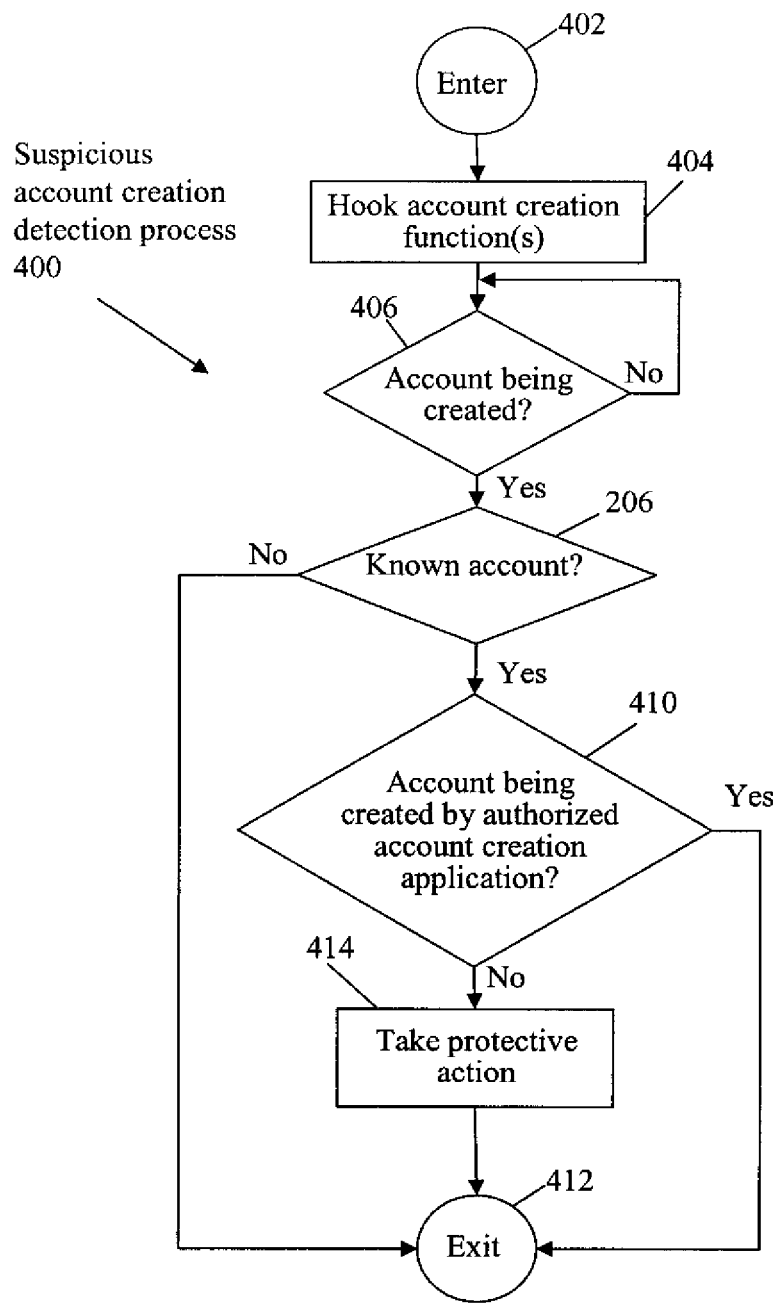
FIG. 4 is a flow diagram of a suspicious account creation detection process in accordance with one embodiment.

In accordance with another embodiment, referring now to FIG. 4, in real time behavior monitoring and blocking, requests to create tracked application-specific accounts are intercepted in an ACCOUNT BEING CREATED CHECK OPERATION 406. If the account creation application that is creating the account is authorized to do so (a "YES" in ACCOUNT BEING CREATED BY AUTHORIZED ACCOUNT CREATION APPLICATION CHECK OPERATION 410), the account is allowed to be created. Conversely, if the account creation application that is creating the account is not authorized to do so (a "NO" in ACCOUNT BEING CREATED BY AUTHORIZED ACCOUNT CREATION APPLICATION CHECK OPERATION 410), the account creation is prevented or other protective action taken in a TAKE PROTECTIVE ACTION OPERATION 414. This real time monitoring effectively closes off the creation of malicious accounts disguised as commonly used account, i.e., as tracked application-specific accounts.

Figure 5:
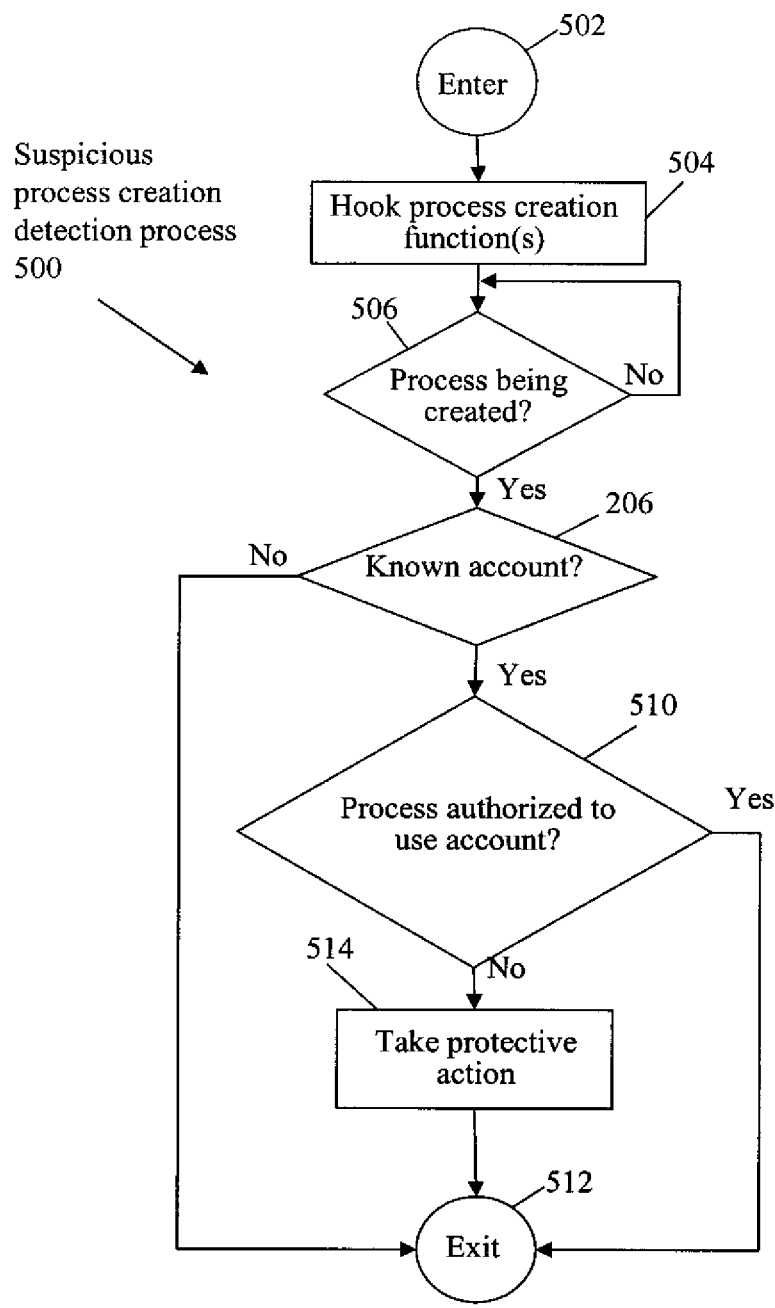
FIG. 5 is a flow diagram of a suspicious process creation detection process in accordance with one embodiment.

In accordance with another embodiment, referring now to FIG. 5, in real time behavior monitoring and blocking, requests to create processes within tracked application-specific accounts are intercepted in a PROCESS BEING CREATED CHECK OPERATION 506. If the process being created is authorized to use the account (a "YES" determination in a PROCESS AUTHORIZED TO USE ACCOUNT CHECK OPERATION 510), the process is allowed to be created. Conversely, if the process being created is not authorized to use the account (a "NO" determination in a PROCESS AUTHORIZED TO USE ACCOUNT CHECK OPERATION 510), the process creation is prevented or other protective action taken in a TAKE PROTECTIVE ACTION OPERATION 514. This real time monitoring effectively closes off the creation of malicious processes within commonly used accounts.

More particularly, FIG. 1 is a diagram of a client-server system 100 that includes an unauthorized account monitoring application 106 executing on a host computer system 102 in accordance with one embodiment.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, unauthorized account monitoring application 106 is loaded into host computer system 102 via I/O device 123, such as from a CD, DVD, or floppy disk containing unauthorized account monitoring application 106.

Host computer system 102 is coupled to a server system 130 of computer system 100 by a network 124. Server system 130 typically includes a display device 132, a processor 134, a memory 136, and a network interface 138.

Host computer system 102 is also coupled to an allowed accounts update information server computer system 160 similar to server system 130 by network 124.

Network 124 can be any network or network system that is of interest to a user. In various embodiments, network interface 138 and I/O interface 110 include analog modems, digital modems, or a network interface card.

Unauthorized account monitoring application 106 is stored, for example, in memory 114 of host computer system 102 and executed on host computer system 102. In accordance with one embodiment, memory 114 further includes an allowed accounts database 140 for use by unauthorized account monitoring application 106.

The particular type of and configuration of host computer system 102, allowed accounts update information server computer system 160, and server system 130 are not essential to this embodiment.

Herein, in one embodiment, malicious code is defined as any computer program, module, set of modules, or code that enters a computer system environment without an authorized user's knowledge and/or without an authorized user's consent.

As will be recognized by one of ordinary skill in the art having the benefit of this disclosure, an account is a set of privileges. A privilege is a permission to perform an action. More particularly, an account determines the primary security context of a process. The security context determines the ability of the process, for example, to access local and network resources.

There are many different types of accounts. Of particular interest are application-specific accounts that are specifically created for an application. An application that creates an application-specific account is referred to as an account creation application. Further, the process created by an account creation application within an application-specific account is referred to as an application-specific process.

To illustrate, Microsoft® Corporation's Internet Information Server (IIS) application creates the following accounts: (1) the 'iisuser' account; (2) the 'IUSER_machinename' account; and 3) the 'IWAM_machinename' account, where machinename is replaced with the name of the host computer system itself. In accordance with this example, the IIS application is the account creation application for the application-specific accounts: (1) the 'iisuser' account; (2) the 'IUSER_machinename' account; and 3) the 'IWAM_machinename' account. Further, once the application-specific accounts are created, the IIS application creates application-specific processes therein.

As another example, Microsoft® Corporation's ASP.net application creates the 'ASP.NET V2.0' account. In accordance with this example, the ASP.net application is the account creation application for the application-specific account: the 'ASP.NET V2.0' account. Further, once the application-specific 'ASP.NET V2.0' account is created, the ASP.net application creates one or more application-specific processes therein.

In yet another example, Microsoft® Corporation's SQL server application creates the 'SQL$' account. In accordance with this example, the SQL server application is the account creation application for the application-specific account: 'SQL$' account. Further, once the application-specific 'SQL$' account is created, the SQL server application creates one or more application-specific processes therein.

Accordingly, an account creation application creates a specially reserve account(s), i.e., the application-specific account(s), uniquely associated with the account creation application. Further, once the application-specific account is created, the account creation application creates a specially reserved process(es), i.e., an application-specific process(es), therein. In accordance with one embodiment, allowed accounts database 140 is a database of application-specific processes, application-specific accounts and associated account creation applications.

In one embodiment, a master copy of the allowed accounts database is maintaining at allowed accounts update information server computer system 160 and updates are downloaded periodically from allowed accounts update information server computer system 160 to host computer system 102 to update allowed accounts database 140.

Illustratively, a security company analyzes applications, accounts, and processes to determine which applications legitimately create application-specific accounts, and which legitimate processes use the application-specific accounts. This information is compiled into allowed accounts database 140.

In one embodiment, an application is an executable file. An executable file is a file who's contents are meant to be interpreted as a program by a computer. In one example, an executable file has a .exe extension (an EXE file) but has other extensions such as .net in other embodiments. An application is executed using any one of a number of techniques as will be recognized by one of ordinary skill in the art having the benefit of this disclosure, and the particular technique used is not essential to this embodiment.

In one embodiment, an account creation application directs the operating system of host computer system 102 to create an account on behalf of the account creation application. In another embodiment, an account creation application includes an installer that creates an account on behalf of the account creation application. However, depending upon the particular operating system and account creation application, accounts can be created on behalf of the account creation application using any one of a number of techniques as will be recognized by one of ordinary skill in the art having the benefit of this disclosure and the particular technique used is not essential.

In one embodiment, a process is an instance of the computer program that is being executed. An account creation application includes at least one process executing with the context of an account. Typically, an account creation application includes several concurrent processes executing within the context of several corresponding accounts.

One example of a process is a service. Services are executable programs that run in sessions outside of the currently logged-on user's session. Typically, services run in the background and may not show any user interface. Services can start automatically when the computer system starts, can be paused and restarted. Accordingly, services are prime vulnerability points for attackers to compromise a computer system.

To illustrate, malicious code, e.g., a compromised service or otherwise malicious process, sometimes called malware, creates an application-specific account for itself and executes within the application-specific account. However, the account creation application which would legitimately create the application-specific account is not present on host computer system 102. Further, the malware is not the application-specific process which would legitimately use the application-specific account.

As described below, in accordance with one embodiment, these mismatches between the existence of the account creation application, the application-specific account, and the malware using the application-specific account are used to detect and defeat the malware.

FIG. 2 is a flow diagram of a suspicious account detection process 200 in accordance with one embodiment. Referring now to FIGS. 1 and 2 together, in one embodiment, execution of unauthorized account monitoring application 106 by processor 108 results in the operations of suspicious account detection process 200 as described below.

From an ENTER OPERATION 202, flow moves to a SELECT ACCOUNT OPERATION 204. In SELECT ACCOUNT OPERATION 204, an account of host computer system 102 is selected. For example, an operating system function is used to enumerate, e.g., list, the active accounts of host computer system 102. A first account from this list of active accounts of host computer system 102 is selected in SELECT ACCOUNT OPERATION 204.

From SELECT ACCOUNT OPERATION 204, flow moves to a KNOWN ACCOUNT CHECK OPERATION 206. In KNOWN ACCOUNT CHECK OPERATION 206, a determination is made as to whether the account selected in SELECT ACCOUNT OPERATION 204 is a known account.

In one embodiment, an account is either a known account or an unknown account. Generally, a known account is specifically created on behalf of an account creation application. Conversely, an unknown account is a generic account that can be created for any one of a number of different reasons and is not uniquely associated with an account creation application.

In accordance with this embodiment, a known account is an application-specific account that appears in allowed accounts database 140. Stated another way, a known account is an application-specific account that is being tracked in allowed accounts database 140. Conversely, an unknown account is a generic or otherwise unknown account that does not appear in, i.e., is absent from, allowed accounts database 140. An example of using allowed accounts database 140 to determine whether an account is a known account or an unknown account is set forth in reference to FIG. 3.

FIG. 3 is a block diagram of allowed accounts database 140 in accordance with one embodiment. As illustrated in FIG. 3, allowed accounts database 140 includes a plurality of entries 302A, 302B, . . . , 302n, collectively entries 302.

Each entry 302 includes a plurality of attributes. Specifically, for each application-specific account, sometimes called a tracked application-specific account, the associated account creation application that legitimately creates the application-specific account is listed as well as the application-specific process that legitimately uses the application-specific account.

The account creation application that legitimately creates the application-specific account is sometimes called the authorized account creation application for the application-specific account. Further, the application-specific process that legitimately uses an application-specific account is sometimes called an authorized process for the application-specific account.

To illustrate, entry 302A includes an application-specific account 304A. Entry 302A further includes an account creation application 306A, i.e., an authorized account creation application, that legitimately creates application-specific account 304A. Further, entry 302A further includes an application-specific process 308A, i.e., an authorized process, that legitimately use application-specific account 304A. The other entries 302B, . . . , 302n contain accounts 304B, . . . , 304n, applications 306B, . . . , 306n, and processes 308B, . . . , 308n, respectively, in a similar manner to entry 302A and so are not discussed in detail.

Although a one to one correlation between account 304A, application 306A, and process 308A is set forth, an account creation application is associated with one or more application-specific accounts in one embodiment. Further, an application-specific account is associated with one or more application-specific processes in one embodiment. In yet another embodiment, the account creation application and the application-specific process are one and the same, i.e., the account creation application creates that account and then uses it.

Although one example of an entry 302A of allowed accounts database 140 is illustrated and discussed above, it is to be understood that allowed accounts database 140 can be organized in any one of a number of different fashions and can contain much more or different information. Generally, for each account, there is an account creation application that is authorized to create the account and one or more processes that are authorized to use the account.

Further, although allowed accounts database 140 is discussed herein as containing accounts, applications, and processes, in light of this disclosure, those of skill in the art will understand that the accounts, the applications, and the processes themselves are not actually contain within allowed accounts database 140, but only their description, e.g., their name or other identifier. Stated another way, allowed accounts database 140 contains a listing of associated accounts, applications, and processes.

To illustrate, the account may be hard-coded such as "SQL$" or a substitution string such as the "IWAM_MACHINENAME', where 'MACHINENAME' is replaced by the name of the machine (host computer system 102) itself. The associated application and/or process is a file name, a hash of the application or process, a digital signature of the application or process, or any other appropriate and secure way to identify the authorized account creation application and authorized process that creates or uses the account. Generally, allowed accounts database can be considered a white list of allowed accounts, applications, and processes.

Accordingly, referring now to FIGS. 1, 2 and 3 together, if the account is not a known account, i.e., is not contained within allowed accounts database 140, flow moves from KNOWN ACCOUNT CHECK OPERATION 206 to an ADDITIONAL ACCOUNT CHECK OPERATION 208, described further below. Conversely, if the account is a known account, i.e., is contained within allowed accounts database 140, flow moves from KNOWN ACCOUNT CHECK OPERATION 206 to an AUTHORIZED PROCESS USING ACCOUNT CHECK OPERATION 210.

In AUTHORIZED PROCESS USING ACCOUNT CHECK OPERATION 210, a determination is made as to whether an authorized process is using the account. As discussed above, an authorized process is an application-specific process that legitimately uses the account.

Illustratively, an operating system function is used to enumerate, e.g., list, the active process of the account. In one embodiment, allowed accounts database 140 is queried to determine whether the active process is authorized to use the account. More particularly, if an entry 302 in allowed accounts database 140 associates the active process with the account, a determination is made that the process is authorized to use the account.

To illustrate, assume that the selected account is account 304A. An operating system function is used to enumerate the active processes of account 304A and returns with an indication that process 308A is using account 304A. As process 308A is associated with account 304A in entry 302A in allowed accounts database 140, process 308A is authorized to use account 304A.

Conversely, if there is no entry that associates the process with the account in allowed accounts database 140, a determination is made that the process is not authorized, i.e., is unauthorized, to use the account. Specifically, as the process is not one that would legitimately use the account, it is highly likely that the process has been created for malicious purposes.

For example, malicious code has created the process, i.e., a malicious process, using a commonly used account in an attempt to disguise the malicious process. However, in accordance with this embodiment, the fact that the malicious process is not authorized to use the account is used to detect the malicious process.

If the process is not authorized to use the account, flow moves from AUTHORIZED PROCESS USING ACCOUNT CHECK OPERATION 210 to a TAKE PROTECTIVE ACTION OPERATION 212. In TAKE PROTECTIVE ACTION OPERATION 212, protective action is taken to protect against the unauthorized process using the account.

In one embodiment, the unauthorized process is terminated. In another embodiment, a notification is provided that an unauthorized process has been detected using the account. In various embodiments, this notification is provided to a user, administrator, to allowed accounts update information server computer system 160, sometimes called a back end system, or otherwise logged. By providing the notification to allowed accounts update information server computer system 160, tracking of threats is facilitated as well as data required to fix possible false positives. Although examples of protective action are set forth, in light of this disclosure, those of skill in the art will understand that a wide variety of protective action can be taken based on policy depending upon the severity of the threat and the desired response thereto.

Returning again to AUTHORIZED PROCESS USING ACCOUNT CHECK OPERATION 210, if a determination is made that the process using the account is authorized, flow moves to an AUTHORIZED ACCOUNT CREATION APPLICATION INSTALLED CHECK OPERATION 214. In AUTHORIZED ACCOUNT CREATION APPLICATION INSTALLED CHECK OPERATION 214, a determination is made as to whether the authorized account creation application for the account is installed on host computer system 102.

As discussed above, for each account, there is an account creation application that is authorized to create the account. In one embodiment, allowed accounts database 140 is queried to determine the account creation application that is authorized to create the account. Further, an operating system function is used to enumerate, e.g., list, the applications installed on host computer system 102. If the account creation application authorized to create the account is included in the list of applications installed on host computer system 102, a determination is made that the account creation application authorized to create the account is installed on host computer system.

To use the example illustrated in FIG. 3 once again, allowed accounts database 140 is queried to determine that application 306A is authorized to create account 304A as set forth in entry 302A. An operating system function is used to enumerate the applications installed on host computer system 102 and returns with an indication that application 306A is installed on host computer system 102. As application 306A is installed on host computer system 102, a determination is made that authorized account creation application 306A for creation of account 304A is installed on host computer system 102.

If a determination is made that the authorized account creation application for creation of the account is installed, flow moves from authorized account creation application installed to ADDITIONAL ACCOUNT CHECK OPERATION 208, which is discussed below.

Conversely, if a determination is made that the authorized account creation application for creation of the account is not installed on host computer system 102, then the account itself is unauthorized, e.g., is malicious. Specifically, as the account creation application that would legitimately create the account is not installed on host computer system 102, it is highly likely that the account has been created for malicious purposes.

For example, malicious code has created and named the account, i.e., a malicious account, after a commonly used account in an attempt to disguise the malicious account. However, in accordance with this embodiment, the fact that the authorized account creation application is not installed on host computer system 102 is used to detect the malicious account.

Accordingly, upon a determination that the authorized account creation application for the account is not installed on host computer system 102, flow moves from AUTHORIZED ACCOUNT CREATION APPLICATION INSTALLED CHECK OPERATION 214 to TAKE PROTECTIVE ACTION OPERATION 212. In TAKE PROTECTIVE ACTION OPERATION 212, protective action is taken to protect against the unauthorized account.

In one embodiment, the unauthorized account and any processes therein are terminated. In another embodiment, a notification is provided that an unauthorized account has been detected. In various embodiments, this notification is provided to a user, administrator, to allowed accounts update information server computer system 160, or otherwise logged. By providing the notification to allowed accounts update information server computer system 160, tracking of threats is facilitated as well as data required to fix possible false positives. Although examples of protective action are set forth, in light of this disclosure, those of skill in the art will understand that a wide variety of protective action can be taken based on policy depending upon the severity of the threat and the response thereto.

Although AUTHORIZED PROCESS USING ACCOUNT CHECK OPERATION 210 is set forth as preceding AUTHORIZED ACCOUNT CREATION APPLICATION INSTALLED CHECK OPERATION 214, the order is not limiting. In other embodiments, AUTHORIZED ACCOUNT CREATION APPLICATION INSTALLED CHECK OPERATION 214 is performed prior to or simultaneously with AUTHORIZED PROCESS USING ACCOUNT CHECK OPERATION 210.

From TAKE PROTECTIVE ACTION OPERATION 212, flow moves to ADDITIONAL ACCOUNT CHECK OPERATION 208. In ADDITIONAL ACCOUNT CHECK OPERATION 208, a determination is made as to whether there are additional accounts of host computer system 102 that have not yet been evaluated as discussed above.

For example, an operating system function is used to enumerate, e.g., list, the active accounts of host computer system 102. In ADDITIONAL ACCOUNTS CHECK OPERATION 208, a determination is made as to whether all of the listed accounts have been evaluated. If there is at least one listed account that has not been evaluated, flow returns from ADDITIONAL ACCOUNTS CHECK OPERATION 208 to SELECT ACCOUNT OPERATION 204 and the next account from the list is selected. OPERATIONS 206, 210, 212, 214, or combinations thereof are performed on this next selected account. This procedure is repeated for each account until all accounts have been evaluated at which point flow moves from ADDITIONAL ACCOUNTS CHECK OPERATION 208 and exits at an EXIT OPERATION 216.

In the above manner, a possibly pre-infected system, e.g., host computer system 102, is inspected for the existence of tracked application-specific accounts. If a tracked application-specific account is found, the host computer system 102 is further audited to verify that only authorized processes are using the account and that the authorized account creation application is installed on the host computer system. For example, on a Microsoft® Windows® type operating system, the list of active services, i.e., processes, are checked to determine that no unauthorized (unexpected) services are running in one of the tracked application-specific accounts.

FIG. 4 is a flow diagram of a suspicious account creation detection process 400 in accordance with one embodiment. Referring now to FIGS. 1 and 4 together, in one embodiment, execution of unauthorized account monitoring application 106 by processor 108 results in the operations of suspicious account creation detection process 400 as described below.

From an ENTER OPERATION 402, flow moves to a HOOK ACCOUNT CREATION FUNCTION(S) OPERATION 404. In HOOK ACCOUNT CREATION FUNCTION(S) OPERATION 404, the account creation function or functions of host computer system 102, e.g., of the operating system, are hooked. An account creation function is a function, sometimes called an application programming interface or API, used to create new accounts. The account creation functions can be hooked using any one of a number of techniques as will be recognized by one of ordinary skill in the art having the benefit of this disclosure, e.g., using a hooked system service table, and the particular technique used is not essential.

Generally, an account creation function is hooked by causing calls to the account creation function to be redirected, e.g., to a hook module of unauthorized account monitoring application 106, in accordance with one embodiment. This stalls execution of the account creation function allowing an evaluation of the legitimacy of the account prior to creation as described below.

From HOOK ACCOUNT CREATION FUNCTION(S) OPERATION 404, flow moves to an ACCOUNT BEING CREATED CHECK OPERATION 406. In ACCOUNT BEING CREATED CHECK OPERATION 406, a determination is made as to whether an account is being created. If an account is not being created, flow remains at ACCOUNT BEING CREATED CHECK OPERATION 406. Conversely, if an account is being created, flow moves from ACCOUNT BEING CREATED CHECK OPERATION 406 to KNOWN ACCOUNT CHECK OPERATION 206.

KNOWN ACCOUNT CHECK OPERATION 206 is substantially similar to KNOWN ACCOUNT CHECK OPERATION 206 of suspicious account detection process 200 of FIG. 2 and so is only briefly repeated here. More particularly, in KNOWN ACCOUNT CHECK OPERATION 206, a determination is made as to whether the account being created is a known account, e.g., appears in allowed accounts database 140.

If the account being created is not a known account, flow moves from KNOWN ACCOUNT CHECK OPERATION 206 and exits at an EXIT OPERATION 412 or returns to ACCOUNT BEING CREATED CHECK OPERATION 406 and awaits the creation of the next account. In accordance with this embodiment, as the account is unknown, no further action is taken and the account is allowed to be created.

Conversely, if the account being created is a known account, flow moves from KNOWN ACCOUNT CHECK OPERATION 206 to an ACCOUNT BEING CREATED BY AUTHORIZED ACCOUNT CREATION APPLICATION CHECK OPERATION 410. In ACCOUNT BEING CREATED BY AUTHORIZED ACCOUNT CREATION APPLICATION CHECK OPERATION 410, a determination is made as to whether the account is being created by an authorized account creation application for the account.

As discussed above, for each account, there is an account creation application that is authorized to create the account. In one embodiment, allowed accounts database 140 is queried to determine the account creation application that is authorized to create the account. Further, the application attempting to create the account is determine, e.g., from parameters associated with the account creation function call or otherwise. If the application attempting to create the account is the authorized account creation application for the account, a determination is made that the account is being created by an authorized account creation application for the account.

To illustrate, paying particular attention to FIGS. 3 and 4 together, assume that account 304A is the account that is being created by application 306A. This attempt to create an account is detected in ACCOUNT BEING CREATED CHECK OPERATION 406 and flow moves to KNOWN ACCOUNT CHECK OPERATION 206. In KNOWN ACCOUNT CHECK OPERATION 206, a determination is made that account 304A is contained within allowed accounts database 140 and so is a known account. Accordingly, flow moves to ACCOUNT BEING CREATED BY AUTHORIZED ACCOUNT CREATION APPLICATION CHECK OPERATION 410.

In ACCOUNT BEING CREATED BY AUTHORIZED ACCOUNT CREATION APPLICATION CHECK OPERATION 410, allowed accounts database 140 is queried to determine the account creation application 306A is authorized to create account 304A. More particularly, entry 302A indicates that account creation application 306A is authorized to create account 304A. Further, parameters associated with the account creation function call are analyzed to determine that application 306A is the application creating account 304A.

Finally, a determination is made that application 306A that is attempting to create account 304A as determined from parameters associated with the account creation function call is the authorized account creation application for account 304A as determined from entry 302A of allowed accounts database 140. Accordingly, a determination is made that account 304A is being created by authorized account creation application 306A for account 304A and flow moves from ACCOUNT BEING CREATED BY AUTHORIZED ACCOUNT CREATION APPLICATION CHECK OPERATION 410 to EXIT OPERATION 412 or returns to ACCOUNT BEING CREATED CHECK OPERATION 406 and awaits the next attempt to create an account. In this event, no further action is taken and account 304A is allowed to be created.

Conversely, if a determination is made that the account is not being created by an authorized account creation application for the account, then the account creation is unauthorized, e.g., is malicious. Specifically, as the account is not being created by the account creation application that would legitimately create the account, it is highly likely that the account is being created for malicious purposes.

For example, malicious code is creating and naming the account, i.e., a malicious account, after a commonly used account in an attempt to disguise the malicious account. However, in accordance with this embodiment, the fact that the authorized account creation application is not the application that is creating the account is used to detect the malicious account.

Accordingly, upon a determination that the account is not being created by an authorized account creation application for the account, flow moves from ACCOUNT BEING CREATED BY AUTHORIZED ACCOUNT CREATION APPLICATION CHECK OPERATION 410 to a TAKE PROTECTIVE ACTION OPERATION 414. In TAKE PROTECTIVE ACTION OPERATION 414, protective action is taken to protect against the unauthorized account creation.

In one embodiment, the attempt to create the unauthorized account is terminated. In another embodiment, the unauthorized account creation application that is creating the unauthorized account is terminated. In yet another embodiment, a notification is provided that an attempt to create an unauthorized account has been detected. In various embodiments, this notification is provided to a user, administrator, to allowed accounts update information server computer system 160, or otherwise logged. By providing the notification to allowed accounts update information server computer system 160, tracking of threats is facilitated as well as data required to fix possible false positives. Although examples of protective action are set forth, in light of this disclosure, those of skill in the art will understand that a wide variety of protective action can be taken based on policy depending upon the severity of the threat and the response thereto.

From TAKE PROTECTIVE ACTION OPERATION 414, flow moves to and exits at EXIT OPERATION 412 or returns to ACCOUNT BEING CREATED CHECK OPERATION 406 and awaits the creation of the next account.

As demonstrated above, allowed accounts database 140 is used in real time behavior monitoring and blocking. More particularly, unauthorized account monitoring application 106, sometimes called a behavior blocking system, intercepts requests to create tracked application-specific accounts. If the account creation application that is creating the account is authorized to do so, the account is allowed to be created. Conversely, if the account creation application that is creating the account is not authorized to do so, the account creation is prevented or other protective action taken. This real time monitoring effectively closes off this avenue of attack from malware writers.

FIG. 5 is a flow diagram of a suspicious process creation detection process 500 in accordance with one embodiment. Referring now to FIGS. 1 and 5 together, in one embodiment, execution of unauthorized account monitoring application 106 by processor 108 results in the operations of suspicious process creation detection process 500 as described below.

From an ENTER OPERATION 502, flow moves to a HOOK PROCESS CREATION FUNCTION(S) OPERATION 504. In HOOK PROCESS CREATION FUNCTION(S) OPERATION 504, the process creation function or functions of host computer system 102, e.g., of the operating system, are hooked. A process creation function is a function, sometimes called an application programming interface or API, used to create new processes. The process creation functions can be hooked using any one of a number of techniques as will be recognized by one of ordinary skill in the art having the benefit of this disclosure, e.g., using a hooked system service table, and the particular technique used is not essential.

Generally, a process creation function is hooked by causing calls to the process creation function to be redirected, e.g., to a hook module of unauthorized account monitoring application 106, in accordance with one embodiment. This stalls execution of the process creation function allowing an evaluation of the legitimacy of the process prior to creation as described below.

From HOOK PROCESS CREATION FUNCTION(S) OPERATION 504, flow moves to a PROCESS BEING CREATED CHECK OPERATION 506. In PROCESS BEING CREATED CHECK OPERATION 506, a determination is made as to whether a process is being created. If a process is not being created, flow remains at PROCESS BEING CREATED CHECK OPERATION 506. Conversely, if a process is being created, flow moves from the PROCESS BEING CREATED CHECK OPERATION 506 to KNOWN ACCOUNT CHECK OPERATION 206.

KNOWN ACCOUNT CHECK OPERATION 206 is substantially similar to KNOWN ACCOUNT CHECK OPERATION 206 of suspicious account detection process 200 of FIG. 2 and so is only briefly repeated here. More particularly, in KNOWN ACCOUNT CHECK OPERATION 206, the account into which the process is being created is determined, e.g., from parameters associated with the process creation function call or otherwise. Further, a determination is made as to whether the account into which the process is being created is a known account, e.g., appears in allowed accounts database 140.

If the account into which the process is being created is not a known account, flow moves from KNOWN ACCOUNT CHECK OPERATION 206 and exits at an EXIT OPERATION 512 or returns to PROCESS BEING CREATED CHECK OPERATION 506 and awaits the creation of the next process. In accordance with this embodiment, as the account is unknown, no further action is taken and the process is allowed to be created.

Conversely, if the account into which the process is being created is a known account, flow moves from KNOWN ACCOUNT CHECK OPERATION 206 to a PROCESS AUTHORIZED TO USE ACCOUNT CHECK OPERATION 510. In PROCESS AUTHORIZED TO USE ACCOUNT CHECK OPERATION 510, a determination is made as to whether the process being created is authorized to use the account.

As discussed above, an authorized process is an application-specific process that legitimately uses the account. In one embodiment, allowed accounts database 140 is queried to determine the process that is authorized to use the account. Further, the process being created is determine, e.g., from parameters associated with the process creation function call.

If the process being created is the authorized process for the account, a determination is made that the process is authorized to use the account.

To illustrate, paying particular attention to FIGS. 3 and 5 together, assume that process 308A is the process that is being created within the context of account 304A. This attempt to create a process is detected in PROCESS BEING CREATED CHECK OPERATION 506 and flow moves to KNOWN ACCOUNT CHECK OPERATION 206.

In KNOWN ACCOUNT CHECK OPERATION 206, account 304A into which process 308A is being created is determined, e.g., from parameters associated with the process creation function call. Further, a determination is made that account 304A is contained within allowed accounts database 140 and so is a known account. Accordingly, flow moves to PROCESS AUTHORIZED TO USE ACCOUNT CHECK OPERATION 510.

In PROCESS AUTHORIZED TO USE ACCOUNT CHECK OPERATION 510, allowed accounts database 140 is queried to determine the process that is authorized to use the account. More particularly, as shown in FIG. 3, entry 302A indicates that process 308A is authorized to use account 304A.

Finally, a determination is made that process 308A that is attempting to use account 304A as determined from parameters associated with the process creation function call is the authorized process for account 304A as determined from entry 302A of allowed accounts database 140. Accordingly, a determination is made that the process being created is authorized to use the account and, paying particular attention to FIG. 5, flow moves from PROCESS AUTHORIZED TO USE ACCOUNT CHECK OPERATION 510 to EXIT OPERATION 512 or returns to PROCESS BEING CREATED CHECK OPERATION 506 and awaits the next attempt to create a process. In this event, no further action is taken and the process is allowed to be created.

Conversely, if a determination is made that the process is not authorized to use the account, then the process creation is unauthorized, e.g., is malicious. Specifically, as the process is not the process that would legitimately use the account, it is highly likely that the process is being created for malicious purposes.

For example, malicious code is creating a process in a commonly used application-specific account in an attempt to disguise the malicious process. However, in accordance with this embodiment, the fact that the malicious process is not the process authorized to use the account is used to detect the malicious process.

Accordingly, upon a determination that the process is not authorized to use the account, flow moves from PROCESS AUTHORIZED TO USE ACCOUNT CHECK OPERATION 510 to a TAKE PROTECTIVE ACTION OPERATION 514. In TAKE PROTECTIVE ACTION OPERATION 514, protective action is taken to protect against the unauthorized process creation.

In one embodiment, the attempt to create the unauthorized process is terminated. In another embodiment, the account and/or the application creating the unauthorized process is terminated. In yet another embodiment, a notification is provided that an attempt to create an unauthorized process has been detected. In various embodiments, this notification is provided to a user, administrator, to allowed accounts update information server computer system 160, or otherwise logged. By providing the notification to allowed accounts update information server computer system 160, tracking of threats is facilitated as well as data required to fix possible false positives. Although examples of protective action are set forth, in light of this disclosure, those of skill in the art will understand that a wide variety of protective action can be taken based on policy depending upon the severity of the threat and the response thereto.

From TAKE PROTECTIVE ACTION OPERATION 514, flow moves to and exits at EXIT OPERATION 512 or returns to PROCESS BEING CREATED CHECK OPERATION 506 and awaits the creation of the next account.

As demonstrated above, allowed accounts database 140 is used in real time behavior monitoring and blocking. More particularly, unauthorized account monitoring application 106, sometimes called a behavior blocking system, intercepts requests to create processes within tracked application-specific accounts. If the process being created is authorized to use the account, the process is allowed to be created. Conversely, if the process being created is not authorized to use the account, the process creation is prevented or other protective action taken. This real time monitoring effectively closes off this avenue of attack from malware writers.

Referring again to FIG. 1, although unauthorized account monitoring application 106 is referred to as an application, this is illustrative only. Unauthorized account monitoring application 106 should be capable of being called from an application or the operating system. In one embodiment, an application is generally defined to be any executable code. Moreover, those of skill in the art having the benefit of this disclosure will understand that when it is said that an application or an operation takes some action, the action is the result of executing one or more instructions by a processor.

While embodiments have been described for a client-server configuration, an embodiment is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a tangible storage medium configured to store computer readable code in accordance with an embodiment. Some examples of computer program products are CD-ROM discs, DVDs, ROM cards, floppy discs, magnetic tapes, computer hard drives, and servers on a network As illustrated in FIG. 1, this medium belongs to the computer system itself. However, the medium is also removed from the computer system. For example, unauthorized account monitoring application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute unauthorized account monitoring application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, unauthorized account monitoring application 106 in accordance with one embodiment can be implemented in a wide variety of computer system configurations. In addition, unauthorized account monitoring application 106 could be stored as different modules in memories of different devices. For example, unauthorized account monitoring application 106 could initially be stored in server system 130, and as necessary, a portion of unauthorized account monitoring application 106 could be transferred to host computer system 102 and executed on host computer system 102. Consequently, part of the unauthorized account monitoring functionality would be executed on processor 134 of server system 130, and another part would be executed on processor 108 of host computer system 102. In view of this disclosure, those of skill in the art can implement various embodiments in a wide variety of physical hardware configurations using an operating system and computer programming language of interest to the user.

In yet another embodiment, unauthorized account monitoring application 106 is stored in memory 136 of server system 130. Unauthorized account monitoring application 106 is transferred over network 124 to memory 114 in host computer system 102. In this embodiment, network interface 138 and I/O interface 110 would include analog modems, digital modems, or a network interface card. If modems are used, network 124 includes a communications network, and unauthorized account monitoring application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A system comprising:
a computing processor; and
a memory coupled to the processor, the memory having stored therein computing processor executable instructions which, when executed by the processor, perform a process comprising:
associating, in an allowed accounts database, an account with a process authorized to use said account, wherein the allowed accounts database comprises a plurality of accounts, associated account creation applications authorized to create said plurality of accounts, and associated processes authorized to use said plurality of accounts, wherein said account is one of the plurality of accounts, wherein said account is an application-specific account specifically created for a particular application, wherein said account is created by an operating system of a first computing system based upon a request to do so by an account creation application, wherein said account has established privileges for an associated authorized process, wherein said associated authorized process is a service that runs in accordance with the established privileges, wherein said associated authorized process is a service of the first computing system, the service being an executable process that is run in a session other than a user session;
determining that a process using said account is not said authorized process by analyzing account and process information within the allowed accounts database and comparing information relating to the process with the account and process information from the allowed accounts database regarding said authorized process; and
taking protective action based upon the determination that said process is not said authorized process.

2. The system of claim 1 further comprising updating said allowed accounts database by periodically downloading updates from an allowed accounts update information server computer system.

3. The system of claim 1 further comprising selecting said account from a list of active accounts on a host computer system.

4. The system of claim 1 wherein said taking protective action comprises terminating said process.

5. The system of claim 1 wherein said taking protective action comprises providing a notification that said process is an unauthorized process that has been detected using said account.

6. The system of claim 5 wherein said notification is provided to an allowed accounts update information server computer system facilitating tracking of said unauthorized process.

7. The system of claim 1 further comprising:
associating an account with an account creation application authorized to create said account;
selecting said account as an active account of a host computer system;
determining whether said authorized account creation application is installed on said host computer system; and
taking protective action based upon a determination that said authorized account creation application is not installed on said host computer system.

8. The system of claim 1 wherein said taking protective action comprises providing a notification that said account is an unauthorized account that has been detected.

9. The system of claim 1 wherein an application of the plurality of associated authorized account creation applications is authorized to create an associated account.

10. A system comprising:
a computing processor; and
a memory coupled to the processor, the memory having stored therein computing processor executable instructions which when executed by the processor, perform a process comprising:
associating, in an authorized accounts database, an account with an account creation application authorized to create said account, wherein the authorized accounts database comprises a plurality of accounts, associated account creation applications authorized to create said plurality of accounts, and associated processes authorized to use said plurality of accounts, wherein said account is one of the plurality of accounts, wherein said account is an application-specific account specifically created for a particular application, wherein said account is created by an operating system of a first computing system based upon a request to do so by an account creation application, wherein said account has established privileges for an associated authorized process, wherein said associated authorized process is a service that runs in accordance with the established privileges, wherein said associated authorized process is a service of the first computing system, the service being an executable process that is run in a session other than a user session;

determining that said account is being created by an application;

determining that said account is not being created by said authorized account creation application by analyzing account and account creation application information within the authorized accounts database and comparing information relating to the application with the account and account creation application information from the authorized accounts database; and taking protective action based upon the determination that said account is not being created by said authorized account creation application.

11. The system of claim 10 further comprising hooking an account creation function used to create said account.

12. The system of claim 10 wherein an allowed accounts database associates said account with said authorized account creation application, said process further comprising:

determining whether said account is a known account comprising determining whether said account is included in said allowed accounts database.

13. The system of claim 10 wherein said taking protective action comprises preventing said account from being created.

14. The system of claim 10 wherein a process of the plurality of associated authorized processes is a service running in accordance with privileges of an associated account.

15. A method comprising:

associating, in an allowed accounts database, an account with a process authorized to use said account, wherein the allowed accounts database comprises a plurality of accounts, associated authorized account creation applications, and associated authorized processes, wherein said account is one of the plurality of accounts, wherein said account is an application-specific account specifically created for a particular application, wherein said account is created by an operating system of a first computing system based upon a request to do so by an account creation application, wherein said account has established privileges for an associated authorized process, wherein said associated authorized process is a service that runs in accordance with the established privileges, wherein said associated authorized process is a service of the first computing system, the service being an executable process that is run in a session other than a user session;

determining that a process using said account is not said authorized process by analyzing account and process information within the allowed accounts database and comparing information relating to the process with the account and process information from the allowed accounts database regarding said authorized process; and taking protective action based upon the determination that said process is not said authorized process.

* * * * *